March 1, 1927.
C. B. FAIRWEATHER
VEHICLE WHEEL
Filed April 21, 1926
1,619,607
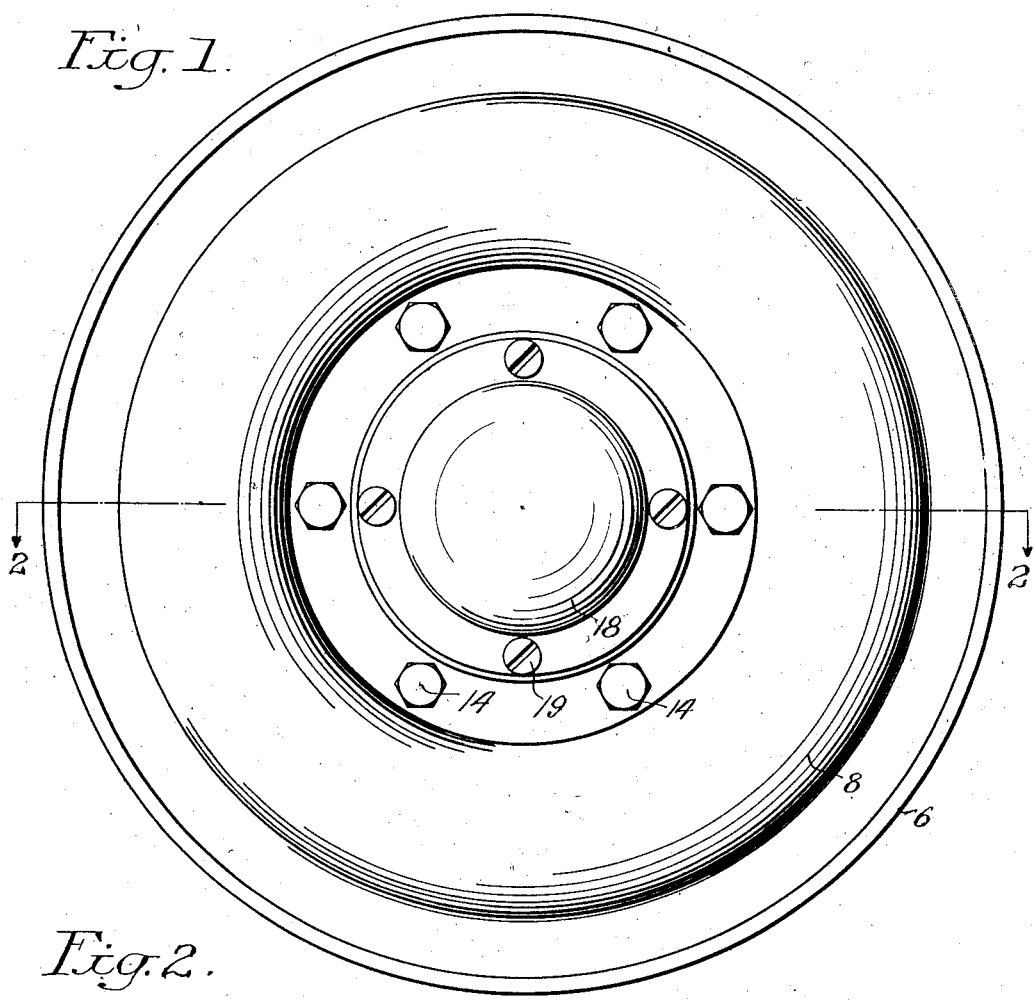
Fig. 1.
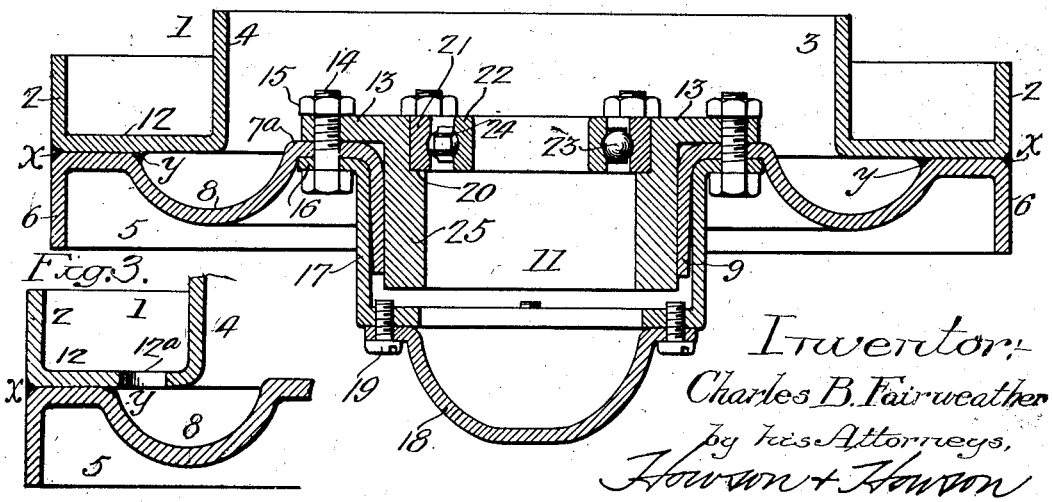
Fig. 2.
Fig. 3.
Inventor:
Charles B. Fairweather
by his Attorneys,
Howson & Howson Patented Mar. 1, 1927.

1,619,607

UNITED STATES PATENT OFFICE.

CHARLES B. FAIRWEATHER, OF WEST CHESTER, PENNSYLVANIA, ASSIGNOR OF ONE-HALF TO FREDERICK E. MOORE, OF COATESVILLE, PENNSYLVANIA.

VEHICLE WHEEL.

Application filed April 21, 1926. Serial No. 103,512.

My invention relates to certain improvements in vehicle wheels, particularly heavy wheels for automobile trucks, although it will be understood that the invention can be used for automobiles of other types without departing from the essential features of the invention.

The object of my invention is to make a substantial wheel in two parts welded together, one part having an integral brake-drum and the other part having an extended housing for the ball-bearing structure. This object is attained in the following manner, reference being had to the accompanying drawings, in which:

Fig. 1 is a face view of my improved wheel;

Fig. 2 is a sectional plan view on the line 2—2, Fig. 1; and

Fig. 3 is a sectional view showing the web perforated.

1 is the rear section of the wheel made from pressed steel in the present instance, having a deep flange 2 at its periphery and having an opening 3 at the center. 4 is a brake-drum made integral with the section 1, being pressed from the section as shown in Fig. 2.

The section 5 has a deep flange 6 at its periphery in alignment with the flange 2 of the section 1, and the web 7 of the wheel has a curved annular portion 8 and a deep housing 9 surrounding the opening 10 in which is located the bearing 11.

The two sections are placed together as shown in Fig. 2, and welded at "x" at the periphery of the wheel and at "y" within the recess formed between the web 12 of the section 1 and the recessed portion 8 of the section 5, the recess being deep enough to allow for the welding operation. In some instances, however, the two parts may be welded only at the periphery as shown at "x".

The bearing 11 has a body portion 25 provided with an external flange 13 which projects over the portion 7ª of the section 5, and is secured to the section 5 by bolts 14 having nuts 15, the bolts passing through openings in the flange 16 of a cap-ring 17, through the portion 7ª, and through the flange 13 of the body portion 25 of the bearing 11.

A cap 18 is secured to the cap-ring 17 by screws 19 or other fastenings as clearly shown in Fig. 2. The body portion 12 of the bearing is recessed at 20 to receive the outer race 21 of a ball-bearing, and between the inner race 22 and the outer race are balls 23 held in place by a flange 24.

The ball-bearing may be of any of the standard constructions. In some instances, the ball-bearings may be dispensed with.

By this construction I have been able to provide a very rigid and substantial brake-drum which can be used with the brake mechanism acting either upon the inner surface of the drum or the outer surface; and by flanging the section 5 I provide an extended and deep housing 9 for the bearing 11. The bearing is supported and is prevented from working loose in the wheel, as the housing supports the bearing throughout a greater portion of its length, and being integral with the body of the wheel, this housing is very substantial and acts as a rigid support for the bearing. The felly of the wheel formed by the flanges 2 and 6 receives the ordinary rim and tire, which may be of any of the standard types.

In some instances the web 12 may be perforated as at 12ª, Fig. 3, to provide for the free circulation of air around the brake-drum and to reduce the heat transmitted from the drum to the rim. The perforations also will prevent the accumulation of dirt in the space between the web 12 and the recessed portion 8.

I claim:

1. The combination in a vehicle wheel, of two pressed metal sections, each section having a flange at its periphery forming a felly, one section having an integral brake-drum and the other section having an extended housing; and a bearing secured to the said section and extending into the housing.

2. A vehicle wheel made in two sections welded together, each section having a peripheral flange forming the felly of the wheel, and one section having an integral extended housing for the bearing of the wheel.

3. A vehicle wheel made in two sections welded together, each section having a peripheral flange forming the felly of the wheel, one section having an integral extended housing for the bearing of the wheel, and the other section having an integral annular flange within the peripheral flange and forming the brake-drum for the wheel.

4. The combination of a metallic vehicle wheel made in two sections welded together, each section having an extended peripheral flange, the two flanges forming the felly of the wheel, one section having a laterally extended brake-drum formed integral therewith, and the other section having an extended housing for a bearing, the latter section having an annular groove and an annular depression between the peripheral flange and the housing, the web of the first-mentioned section extending over a portion of said depression.

5. The combination in a metallic vehicle wheel made in two sections, each section having a peripheral flange, the peripheral flanges of the sections forming the felly of the wheel, one section having a brake-drum and the other section having an extended housing for a bearing, the latter section having an annular depression between the peripheral flange and the housing, the web of the first-mentioned section extending over a portion of the depression, the two parts being welded at the periphery and at the junction of the depressed portion and the extending web.

6. The combination in a metallic wheel made in two sections, each section having a peripheral flange, the two flanges forming the felly of the wheel, one section having an annular extension forming a brake-drum, and the other section having an extended housing formed integral with the said section; a bearing having a flanged body portion; a ball-bearing mounted in the body portion; a cap-ring located on the outside of the extended housing; a series of bolts extending through a flange on the cap-ring, through the body portion of one section of the wheel and the flange of the body portion of the bearing; and a detachable cap mounted on the cap-ring.

7. The combination in a vehicle wheel, of two pressed metal sections, each section having a flange at its periphery, one section having a brake-drum, the section being perforated between the drum and the flange, and the other section having an extended housing for a bearing.

CHARLES B. FAIRWEATHER.